(12) United States Patent
Koss

(10) Patent No.: US 8,235,156 B2
(45) Date of Patent: Aug. 7, 2012

(54) RETROFITABLE ROPS REINFORCEMENT STRUCTURE FOR CAB RAISER INTERFACE

(75) Inventor: Michael Koss, Wausau, WI (US)

(73) Assignee: Micheal James Koss, Wausau, WI (US)

(*) Notice: Subject to any disclaimer, the term of this patent is extended or adjusted under 35 U.S.C. 154(b) by 748 days.

(21) Appl. No.: 12/296,396

(22) PCT Filed: May 26, 2007

(86) PCT No.: PCT/US2007/069827
§ 371 (c)(1),
(2), (4) Date: Oct. 7, 2008

(87) PCT Pub. No.: WO2008/147410
PCT Pub. Date: Dec. 4, 2008

(65) Prior Publication Data
US 2010/0290881 A1    Nov. 18, 2010

(51) Int. Cl.
*B62D 33/06* (2006.01)
*B62D 33/077* (2006.01)
(52) U.S. Cl. ............... 180/89.12; 180/311; 280/781; 37/397; 296/190.03
(58) Field of Classification Search ............ 180/89.1, 180/89.11, 89.12, 311; 37/397, 395; 280/781; 296/190.03
See application file for complete search history.

(56) References Cited

U.S. PATENT DOCUMENTS

| | | | |
|---|---|---|---|
| 3,732,941 A | 5/1973 | Davis et al. | |
| 3,833,034 A | 9/1974 | Menzel et al. | |
| 3,866,942 A | 2/1975 | Dobeus et al. | |
| 4,579,157 A | 4/1986 | Lindblom | |
| 6,523,905 B2 | 2/2003 | Tamura et al. | |
| 6,986,371 B1 | 1/2006 | Nordstrom | |
| 7,131,686 B1 * | 11/2006 | Jo et al. | 296/190.03 |
| 7,246,846 B2 * | 7/2007 | Shioji et al. | 296/190.11 |
| 7,427,097 B2 * | 9/2008 | Yoon | 296/190.03 |
| 7,434,869 B2 * | 10/2008 | Murakami | 296/190.03 |
| 7,445,272 B2 * | 11/2008 | Lee | 296/190.03 |
| 7,681,918 B2 * | 3/2010 | Lacher et al. | 280/781 |
| 7,695,055 B2 * | 4/2010 | Tsukamoto | 296/190.11 |
| 7,770,963 B2 * | 8/2010 | Tsukamoto et al. | 296/190.08 |
| 7,913,789 B2 * | 3/2011 | Lee | 180/89.12 |
| 2004/0221490 A1 * | 11/2004 | Cooper et al. | 37/403 |
| 2005/0000121 A1 * | 1/2005 | Mori | 37/347 |
| 2005/0006157 A1 * | 1/2005 | Shioji et al. | 180/89.13 |
| 2006/0249986 A1 * | 11/2006 | Yoon | 296/190.03 |
| 2007/0018484 A1 * | 1/2007 | Lee | 296/190.08 |
| 2007/0035160 A1 * | 2/2007 | Murakami | 296/190.03 |
| 2010/0096211 A1 * | 4/2010 | Asam et al. | 180/311 |

FOREIGN PATENT DOCUMENTS

| | | |
|---|---|---|
| DE | 2553822 A1 | 2/1977 |
| FR | 2260938 | 10/1975 |
| WO | PCT/NZ2004/000206 | 9/2004 |
| WO | 2005/020670 A1 | 3/2005 |
| WO | WO/2005/020270 | 3/2005 |

* cited by examiner

*Primary Examiner* — Drew Brown
(74) *Attorney, Agent, or Firm* — Lane Patents LLC; Fred Lane

(57) ABSTRACT

A reinforced cab riser adapter, which adapts to standard rollover protection structure (ROPS) to a swing frame on a hydraulic excavator resulting in improved rollover load bearing capacity, is disclosed. This invention is also retrofit-able and can be universally adapted to a wide variety of swing frames without cutting or welding of the base machine. The present invention relates to safety features with respect to attaching a cab to a frame on load bearing vehicles.

3 Claims, 5 Drawing Sheets

RETROFITABLE ROPS REINFORCEMENT STRUCTURE FOR CAB RAISER INTERFACE

REFERENCED APPLICATIONS

The present application is a continuation application of U.S. provisional patent application Ser. No. 60/803,341; filed 26 May 2006; and International application, serial number PCT/US07/69827; filed 26 May 2007 in the US Receiving Office; for RETROFITABLE ROPS REINFORCEMENT STRUCTURE FOR CAB RAISER INTERFACE. Both applications included by reference herein and for which benefit of the priority date is hereby claimed.

FIELD OF THE INVENTION

The present invention relates to safety features with respect to attaching a cab to a frame on self-propelled off-road load bearing vehicles, and, more particularly, to a reinforced cab riser adapter. The cab riser adapter retrofits to and integrates with a main frame on a hydraulic excavator resulting in improved rollover load bearing capacity in a roll-over-protection-structure (ROPS). This invention can be universally adapted to a wide variety of swing frames without cutting or welding of the base machine, which also allows the base machine to be converted back to its original utility.

BACKGROUND OF THE INVENTION

Forestry continues to be a vital part of many economies worldwide. As populations expand and the public continues to move into remote areas of country with dense vegetation, such as forest and woodlands, new and better ways of clearing vegetation and providing building materials for new dwellings are needed.

Implements for mechanized clearing and grooming of such vegetation have been developed over recent years, specifically designed for the harvest of forest lands.

These purpose built machines are very specialized in their specific purpose, not easily adapted to other uses. They are also expensive.

Some lower cost alternatives involve retrofitting vehicles such as excavators or backhoes with a swing frame and a boom apparatus have been used as an alternative to the purpose built. To retrofit an existing structure, one may start with a common chassis from a small bulldozer or excavator, which provides the locomotive means. This chassis is usually denoted as the car body or car chassis of the machine. A slew bearing, which provides a surface for pivotal rotation, is mounted on the chassis. Also typically integrated just above the slew bearing is the swing frame. The boom mechanism is typically attached to the swing frame in a way to azimuthally rotate to facilitate the raising and lowering of the boom, similar to a turret. This boom mechanism is typically outfitted with an implement for clearing or processing brush and trees. The skirt frame, which provides support for the cab housing, extends orthogonally from the swing frame and is typically cantilevered from the slew bearing. The combination of the skirt frame, the swing frame, and the slew bearing are often referred to as the main frame.

Also attached to the main frame above the skirt frame is a typically where the cab, or cabin, for the operator can be found. This cab region also typically provides attachments for electrical and other necessary components for operating the forest harvesting machine. It is this region that needs to be protected for the safety of the operator and where the roll over protection structures (ROPS) are found.

Because of the design structure requiring the skirt frame to be cantilevered from the slew bearing, such structures adapted from excavator car chassis and the like, are not capable of withstanding the intense loads and energy absorption needs commonly found in forestry applications, in particular with relationship to the main frame loads and roll over situations where the roll over is directed to the cab side, bringing the weight of the mainframe and boom structures to bear on the cab. In particular, it has been found that skirt frame designs of the prior art, for retrofitable off-road and forestry vehicles, are not sufficient to withstand ROPS loads without buckling in these situations.

When machines of the prior art have been subjected to these loads or need to absorb energy such as that created by falling trees, rollovers and the like, the region between the skirt frame and cab may likely buckle. Another possibility is that the cab structure itself will compress under the loads and stresses. When this happens the result may be operator death, or injury. In lesser cases; safety risks, equipment downtime issues, and expensive equipment repairs are seen.

U.S. Pat. No. 3,732,941 issued to Davis et al 15 May 1973 discloses a tractor body with a roll-over-protection structure and braces for providing a unitary structure which are welded to and integrated with the manufacture of the cab. While this does point to the felt need for such protection, the disclosed features are adapted to a tractor, and are not adequate to the added weight and structural requirements of a swing frame or boom structure. In addition, it is directed to the roll-over cage and is welded as part of the structure and does not have the retrofit ability and universality of the present invention to mount onto existing frames.

U.S. Pat. No. 3,866,942 issued to Dobeus et al 18 Feb., 1975 discloses a rollover protection apparatus which has legs that are secured to brackets on top of the operator's platform including connection points. The main point behind this disclosure is the addition of bushings to absorb the energy of a roll-over and direct it to the recoverable bending of the cage. While the approach may work for the conditions encountered by the inventor, it is believed that the disclosed structure is not only insufficient for the conditions of the present invention, but the addition of bushings as connection features, under the weight of the main frame, will be structurally incapable.

There are many manufactures of forestry excavator equipment, including John Deere, Hitachi, IMC and others. All of these manufactures have similar boom cab to swing frame assemblies, but prior art in the area of structures adapted from excavator car chassis have not provided a sufficiently safe ROPS structure.

Other solutions do not reinforce a main frame-to-cab interface sufficiently to absorb the loads and energies required without extensive damage to the structure.

This results in buckled swing frames which are expensive to repair.

It also results in unsafe conditions for the cab operator, should the cab buckle.

It also results in significant downtime to repair damaged frames.

Other approaches to the problem and capable of withstanding such loads are not retrofitable and require cutting, welding and/or other modification to the main frame and/or cab in order to be fitted.

Once modifications are made, and it is desired to return the equipment to its original condition, further cutting, welding and/or other modifications are often required.

It is therefore an object of the invention to provide a structure to reinforce the frame between the cab riser and the swing frame to improve load bearing capability.

It is another object of the invention that this structure provides improved rollover energy absorption capability by substantially transferring excessive energy of impact or load from the cab to the main frame.

It is another object of the invention to provide a safer work environment for the Operator by providing a buckle resistant cab and frame.

It is another objective of the invention to reinforce the cab and frame, which lessens downtime for repairs.

It is another object of the invention to allow the retrofit of a standard backhoe or excavation frame into forest harvesting machines, which can withstand. ROPS loads.

It is another object of the invention to reinforce the frame, which lessens downtime for repairs It is another object in the invention to allow the retrofit of standard backhoe or excavation frames into forest harvesting machines without the need for substantial modification cutting or welding.

It is another object of the invention to allow the restoring of the standard backhoe or excavation frames from forest harvesting machines without the need for substantial modification, cutting or welding.

It is another object of the invention to provide a rollover protection structure which is located primarily under the operator.

It is another object of the invention to provide a rollover protection structure which is demountably attached.

SUMMARY OF THE INVENTION

In accordance with the present invention, there is provided a lateral structural support member customizable to fit with a wide variety of swing frames and car bodies with minimal modification. It acts to transfer significant loads from the It acts as a lateral structural support member below the floor of the cab which is prone to buckle under standard ROPS loads.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Figure 1:
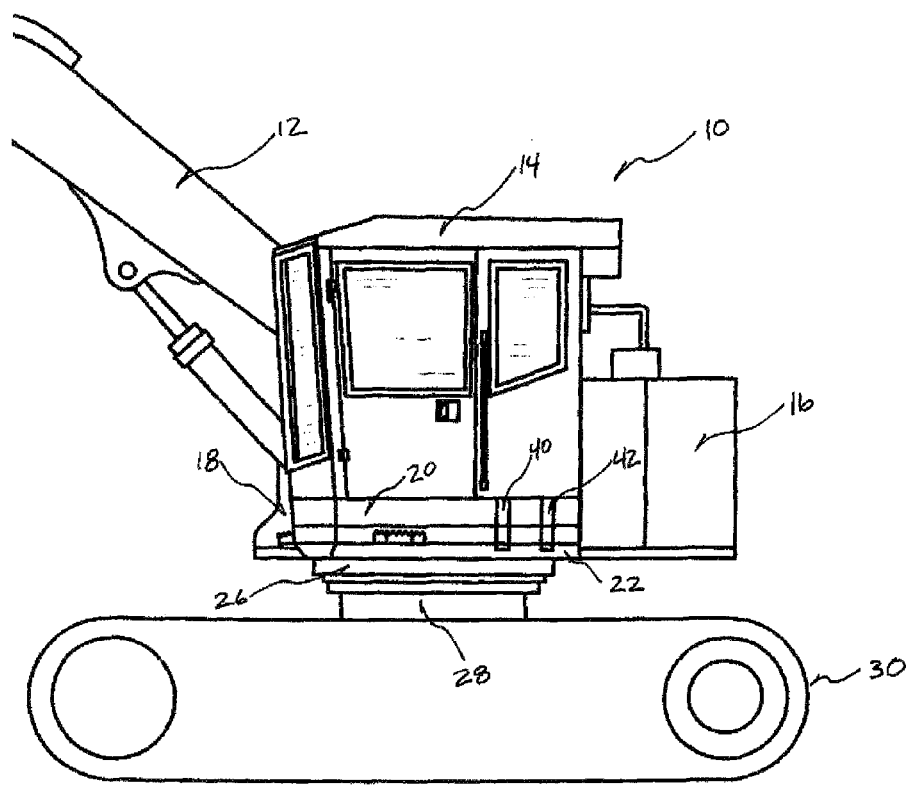
FIG. 1 is a side view of one embodiment of a forest harvesting machine with the present invention.
Figure 2:
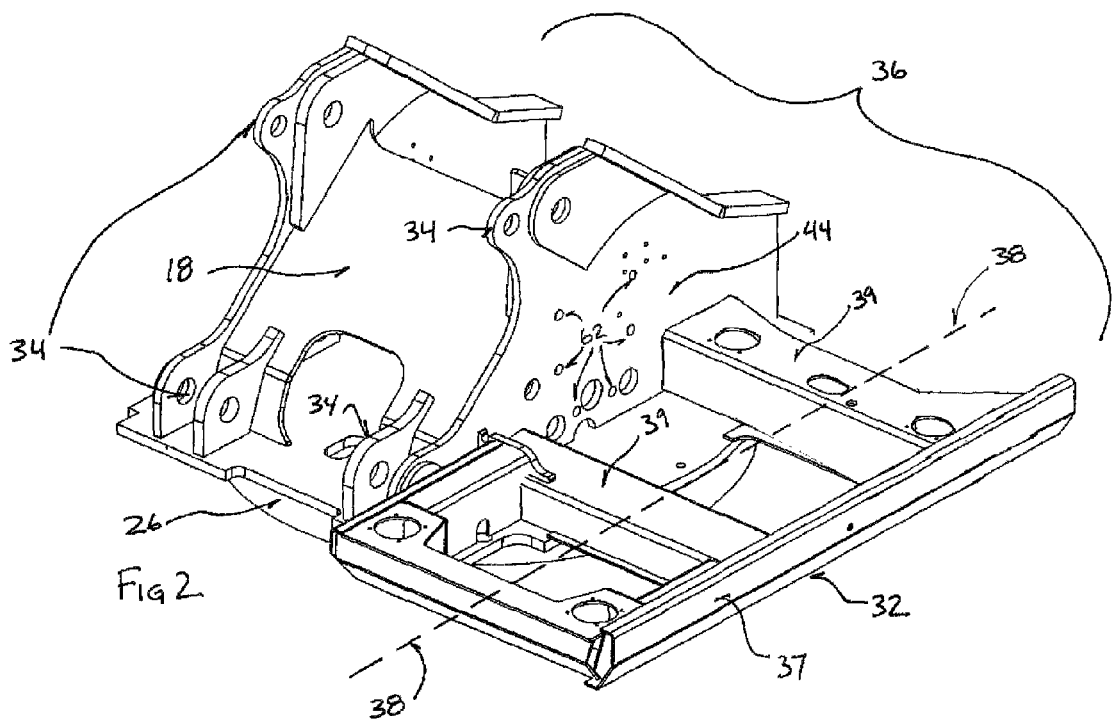
FIG. 2 is perspective view of a main frame embodiment.

The forest harvesting machine 10 of FIG. 1 is comprised of several major elements including a boom structure 12 attached to a swing frame 18 by way of a boom attachment means 34 shown in FIG. 2. The swing frame 18 is mounted to a car chassis also known as a car body 28 by means of a slew bearing 26 which is also integrally connected underside of the swing frame 18, again shown in FIG. 2. The slew bearing 26 is rotatably mounted atop the car body 28 such that it can pivot to allow access to trees in a radius about the vehicle. A locomotive means 30 is also coupled with the car body 28 to move from location to location. The cab structure 14, for housing and shielding the operator and controls for the vehicle, and cab attachments 16, for housing engines, generators, fuel and the like, are supported by the skirt frame 32 (not shown in FIG. 1). The cab structure 14, which is a substantially rectangular box made of steel or other such material, is mounted on a riser frame 22 and is also comprised of windows, doors, and the like.

The main frame in FIG. 2 is typical of that found in the current art. The swing frame 18, along with the skirt frame 32 and the slew bearing 26 combine to form the main frame 36 which is typically constructed as one piece as shown in FIG. 2. This main frame 18 forms the skeleton upon which the conversion from excavation machine to forestry vehicle is accomplished. The main weight bearing members being the swing frame 18, which is a substantially turret like structure which provides a boom attachment means 34 for mounting the boom structure 12. Another important function of the swing frame 18 is to transfer the weight from the boom structure 12, connected by the boom attachment means 34, through the slew bearing 26 and on to the car body 28.

The skirt frame 32, for providing a platform for the cab structure 14, is cantilevered to the side of the swing frame 18 diagonally higher than the slew bearing 26. The skirt frame is a can be seen as substantially two beams of ¼ to ½ inch steel referred to here as, the swing frame beam fore 39 and the swing frame beam aft 41, which orthogonally extend from, and are permanently affixed to, the swing frame 18 and partially resting upon the top of the slew bearing 26. The two beams 39 and 41 are coupled at the distal end by a tie beam 37 which cantilevers parallel with the swing frame proximal vertical receiving plate 44 to provide the outside platform for mounting the cab structure 14.

In the case of a rollover in the direction of the cab structure 14, substantially the weight of the entire machine 10 is brought to bear upon the skirt frame 32, as described above, many times causing the skirt frame to buckle at or around the buckle line 38, represented by the dashed line, directly below where the operator is seated.

Figure 3:
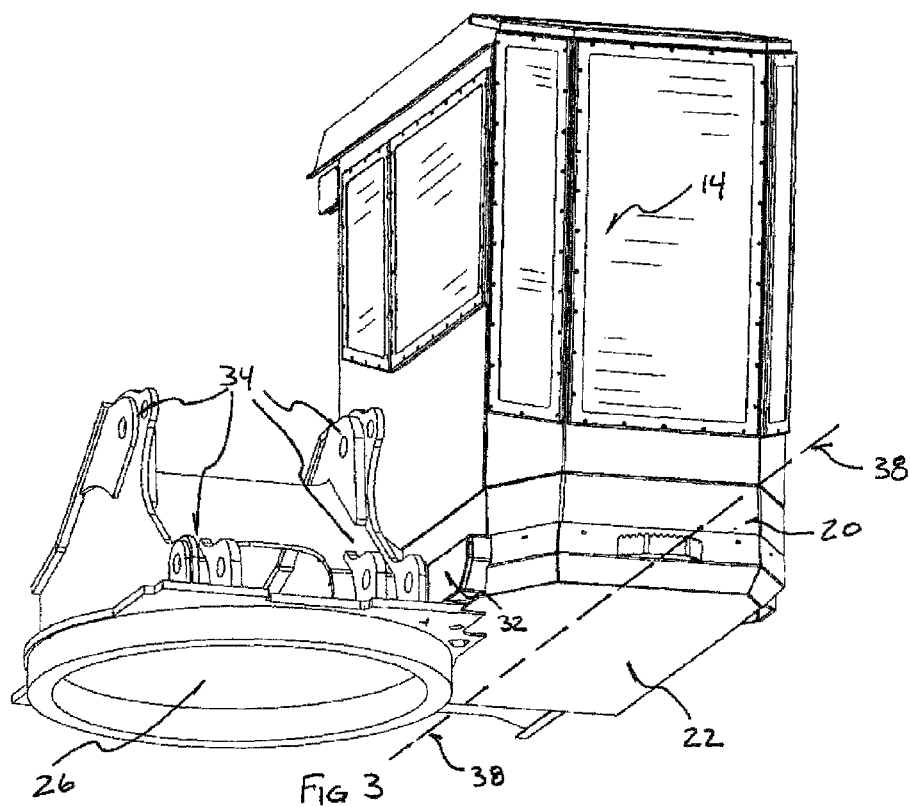
FIG. 3 is a perspective bottom view of a cab structure mounted to a swing frame main member.

FIG. 3 is a perspective bottom view of a cab structure 14 connected with and resting upon a skirt frame 32 with a mounted atop a riser frame 20. The skirt frame 32, being part of the main frame 36, projecting in to the undercarriage guard structure 22. The undercarriage guard structure is typically a thin metal skin with no structural integrity and is removably attached to the bottom of the riser frame 20 to protect from brush and debris. The cab structure 14 is removably attached, usually by means of bolting, to the riser frame 22, and rests upon the skirt frame 32. As was also noted in FIG. 2, the buckle line 38 extends substantially through the middle of the cab structure 14.

Figure 4:
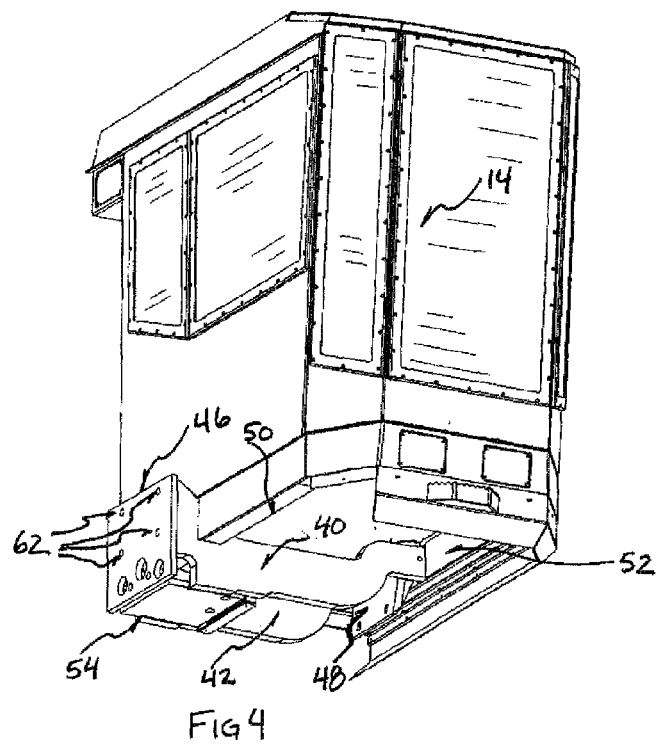
FIG. 4 is a perspective bottom view of a cab structure with a cutaway view of the structural elements which comprise the reinforcement structure.

In FIG. 4 the main frame 36 of FIG. 2 and the undercarriage guard structure 22 of FIG. 3 are cut away to show the main elements of this embodiment of the invention and highlight the reinforcement structure for the cab riser interface. As can be seen, the lateral structural support is carried primarily by the lateral structural member fore 40 and a lateral structural member aft 42 which are located approximately below the operator in the cab structure 14. Each lateral support member should be of steel, hardened steel, or the like and at least approximately 1 to 2 inches thick in order to bear anticipated loads. As those skilled in the art would understand, the thickness may be somewhat more or less than what was called out depending upon the weight vs. load requirements of the vehicle. Both lateral structural members are securely attached to a proximal vertical attach plate 46, which can then be removably connected to the proximal vertical receiving plate 44. The proximal vertical attach plate 44 also serves to tie the two lateral structural support members 40 and 42 together to act as one unit. A distal tie member 48 is located at the other end of the two lateral structural support members 40 and 42 to further provide stability and strength. This lateral support system serves to strengthen the cab from side to side loads and shear loads front to back. In addition to the lateral structural members are a proximal torque member 50 and a distal torque member 52 which are cantilevered forward under the cab structure 14 to further strengthen the cab from front to back loads. Connecting the lateral structural member fore 40 and the lateral structural member aft 42 with the proximal vertical attach plate 46 at one end and the distal bracket with ROPS tie in at the other a box like structure is made which also allow all units to share the load and stiffens them to further improve load and impact bearing capability while still being able to allow the improvement to fit into a retrofit structure. The proximal vertical and proximal horizontal plates 44, 46, 54 and 56 act under load as one unit.

Figure 5:
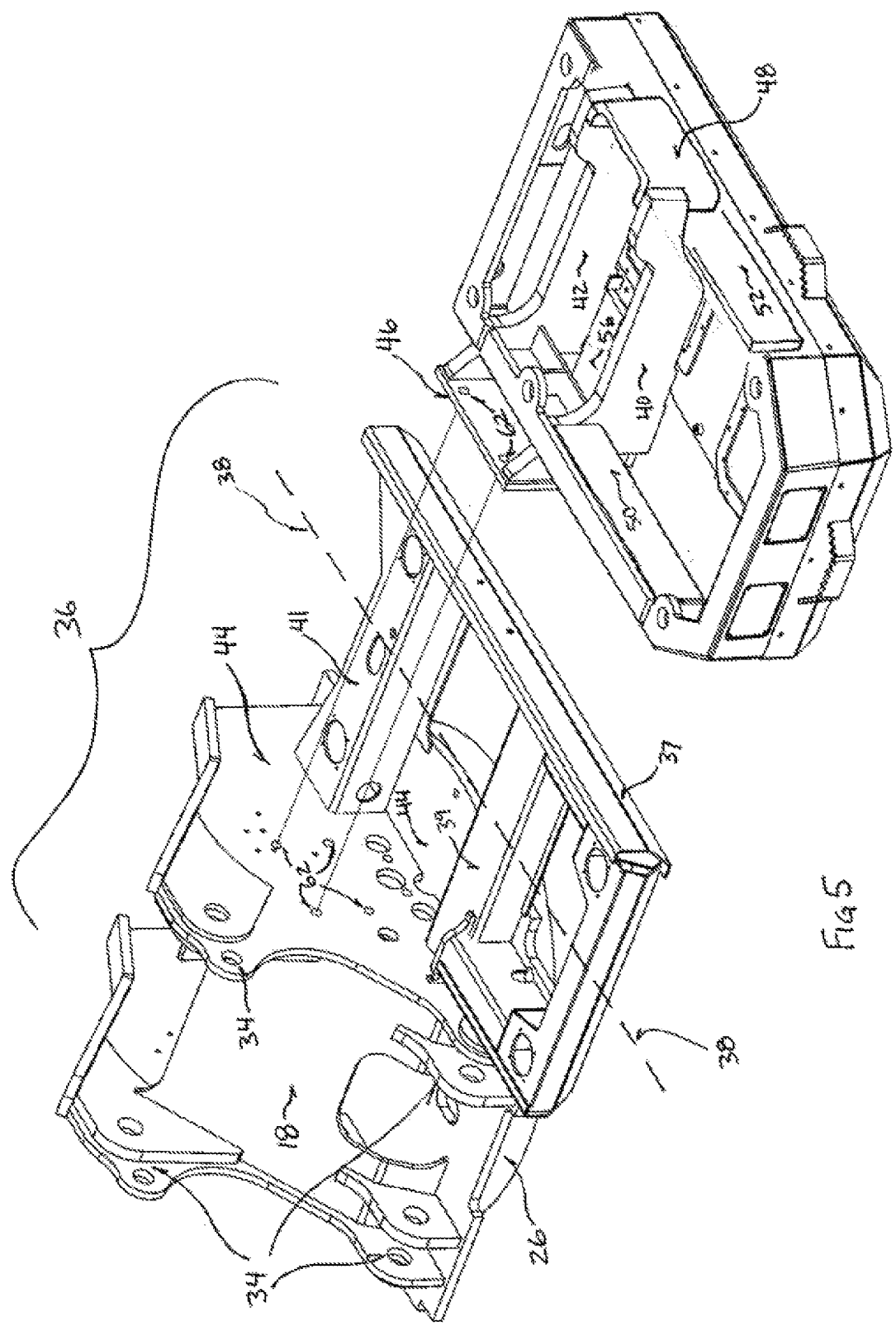
FIG. 5 is an exploded view of the swing frame main member with skirt frame with attachment interface to a riser frame.

FIG. 5 shows how the structures fit together in a way to transfer the rollover load from the outside of the cab to the main frame 36 without buckling 38 the skirt frame 32. The first feature of note is the customization pattern 62, which is comprised of the pattern of holes for bolts, cabling and the like, needed to match the proximal vertical attach plate 46, which can be customized, with the pattern of bolt holes on the proximal vertical receiving plate 44 which is typically set on the existing main frame 36. The customization pattern can also be repeated between the proximal horizontal attach plate 54 and the proximal horizontal receiving plate 56. The experienced practitioner will appreciate that other means beside bolts can be used to attach the plates 46 and 54. However, when bolts are used they should be of hardened high tensile strength material such as high grade steel. These members can be customized to fit a variety of OEM manufacturer equipment by providing a customization pattern 62, which is a pattern tailored to the manufacturer.

With requirements for cabling, hydraulic lines, wiring and the like, space is at a premium in the infrastructure of the cab structure 10. The present embodiment of the invention is designed such that the lateral structural support member fore 40 is juxtaposed with the swing frame beam fore 39 and the lateral structural support member aft is juxtaposed with the swing frame beam aft 41 sitting generally below the level of the top of the skirt frame 32. In addition to giving structural reinforcement, it creates an open chase for cabling.

Figure 6:
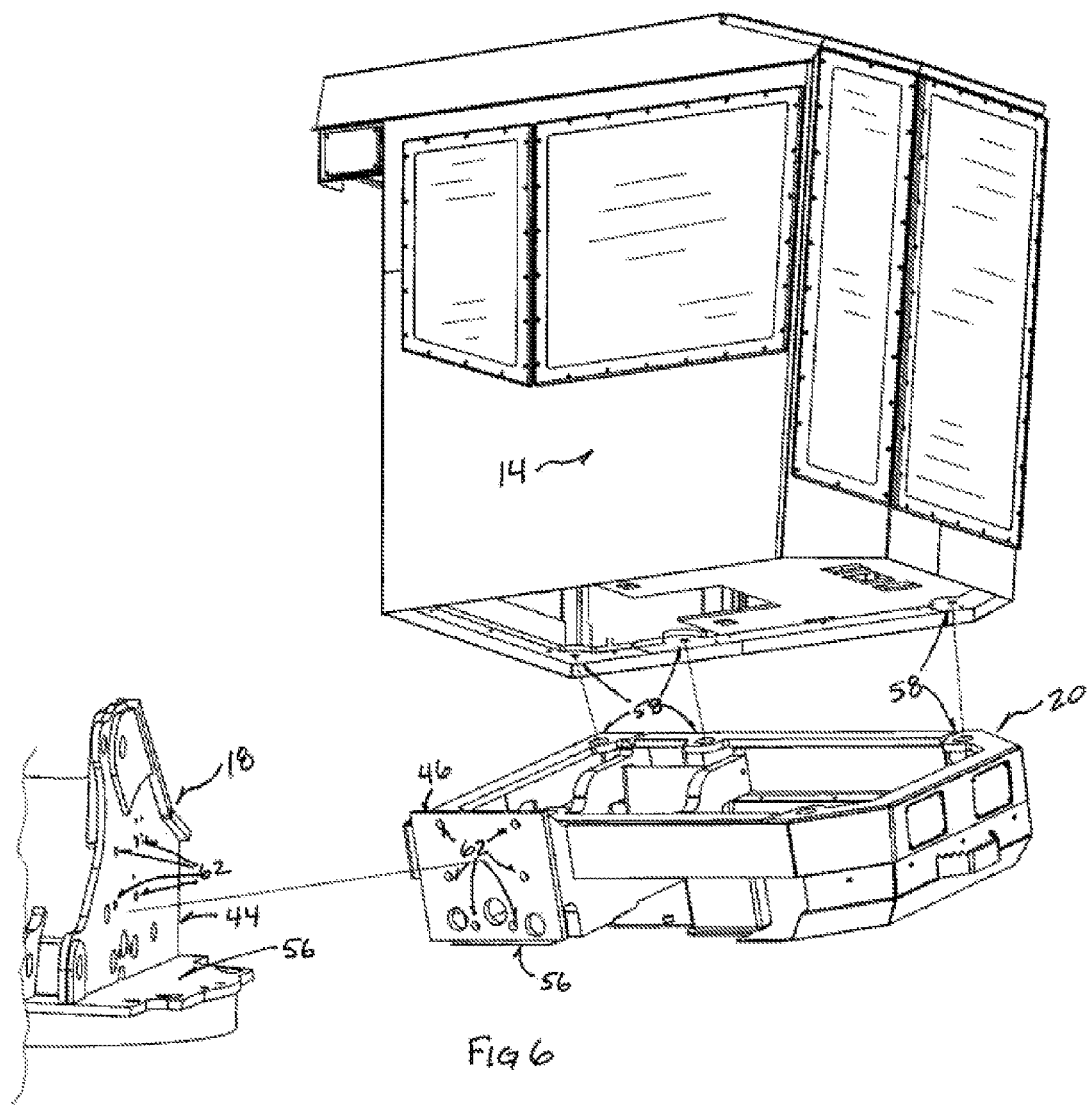
FIG. 6 is an exploded view of the cab structure, riser frame and swing frame main member showing a typical assemblage.
Figure 7B:
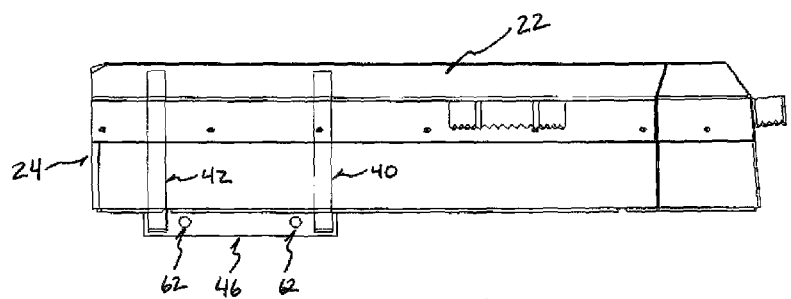
FIG. 7b is an inverted side view of a riser frame.
Figure 7A:
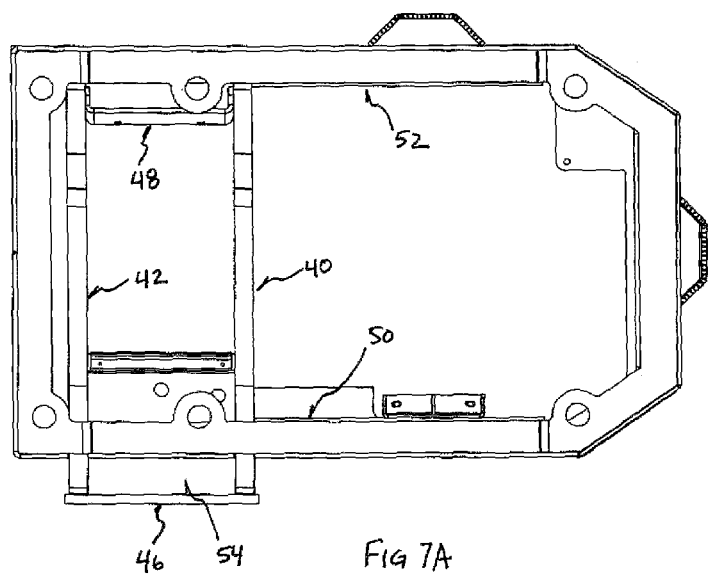
FIG. 7a is a top down view of a riser frame.
Figure 7C:
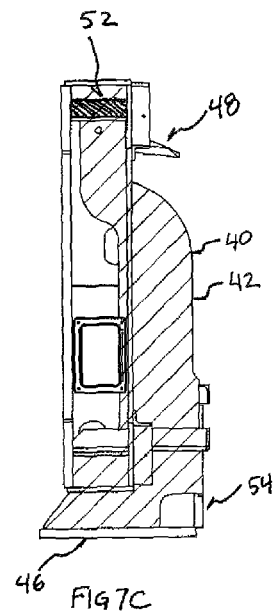
FIG. 7c is a front cutaway view of a riser frame.

The mounting of the cab structure 10 to the riser frame 20 and the swing frame 18 is shown in FIG. 6. The skirt frame 32 was omitted from the view in order to highlight the customization patterns 62 of both the horizontal and vertical plates; 44, 46, 54, 56 on one embodiment of the invention.

FIGS. 6a, b, and c, highlight the placement of the lateral structural support member 28 into the riser frame 18.

Conclusion, Ramifications, and Scope

Although the present invention has been described in detail, those skilled in the art will understand that various changes, substitutions, and alterations herein may be made without departing from the spirit and scope of the invention in its broadest form. The invention is not considered limited to the example chosen for purposes of disclosure, and covers all changes and modifications which do not constitute departures from the true spirit and scope of this invention.

For example the riser details may vary from excavator model to excavator model in terms of dimensions and exact position of riser structural members, depending on the physical arrangement of the excavator structural members, as well as the excavator machine mass.

In other embodiments there may be a plurality of lateral structural support members greater than two coupled together to act substantially as one member.

Having thus described the invention, what is desired to be protected by Letters Patent is presented in the subsequent appended claims.

What is claimed is:

1. A reinforcement structure for use in a forest harvesting machine, having a main frame comprising a slew bearing, a swing frame, and a skirt frame, having a cab structure being mounted substantially cantilevered from the slew bearing, resulting in improved roll over protection structure, in situations where the rollover is directed to the cab side, having an increased load bearing capability comprising:
   (i) lateral structural support members comprising a plurality of solid beams made of rigid material for providing a load bearing and transfer means between excessive forces and the main frame;
   (ii) a part of the main frame comprising rigid proximal receiving plates, for receiving loads transferred by the roll-over protection structure;
   (iii) a rigid plate being vertically oriented and containing a plurality of attach points, for coupling the lateral structural support members together so as to act as one member, and to tie said members to the main frame and being rigidly connected to said lateral structural support members;
   (iv) a second rigid plate coupling member, for coupling said plurality of lateral structural support members together so as to act as one member at the perimeter of the cab structure for receiving excessive loads, rigidly connected to said lateral structural support members.

2. The reinforcement structure in accordance with claim 1, further comprising: the proximal receiving plates having holes or spaces arranged in a spatial pattern which is customizable.

3. The reinforcement structure in accordance with claim 1, further comprising: said slew bearing providing a connection with a car body for providing locomotion, said swing frame providing a mounting for a boom structure, and said skirt frame providing a platform for mounting the cab structure.

* * * * *